(12) United States Patent
Guldberg

(10) Patent No.: US 9,346,116 B2
(45) Date of Patent: May 24, 2016

(54) METHOD AND DEVICE FOR MANUFACTURING TITANIUM OBJECTS

(75) Inventor: Sigrid Guldberg, Oslo (NO)

(73) Assignee: Norsk Titanium AS, Hønefoss (NO)

(*) Notice: Subject to any disclaimer, the term of this patent is extended or adjusted under 35 U.S.C. 154(b) by 940 days.

(21) Appl. No.: 13/390,203

(22) PCT Filed: Aug. 11, 2010

(86) PCT No.: PCT/NO2010/000303
§ 371 (c)(1),
(2), (4) Date: Apr. 17, 2012

(87) PCT Pub. No.: WO2011/019287
PCT Pub. Date: Feb. 17, 2011

(65) Prior Publication Data
US 2012/0193335 A1    Aug. 2, 2012

(30) Foreign Application Priority Data

Aug. 14, 2009 (GB) .................... 0914301.7

(51) Int. Cl.
B23K 9/04 (2006.01)
B23K 9/173 (2006.01)
B23K 10/02 (2006.01)
B22F 3/105 (2006.01)
(Continued)

(52) U.S. Cl.
CPC ............. *B23K 10/027* (2013.01); *B22F 3/1055* (2013.01); *B23K 9/044* (2013.01); *B23K 9/162* (2013.01); *B23K 9/173* (2013.01); *B23K 37/0229* (2013.01); *B23K 37/0461* (2013.01); *B29C 67/0074* (2013.01); *B29C 67/0085* (2013.01); *G05B 19/4099* (2013.01); *B22F 2003/1056* (2013.01); *B22F 2003/1057* (2013.01); *B22F 2998/00* (2013.01); *B23K 2203/14* (2013.01); *Y02P 10/295* (2015.11)

(58) Field of Classification Search
CPC .... G05B 19/4099; B23K 9/044; B23K 9/162; B23K 37/0229; B23K 37/0461; B29C 67/0074; B29C 67/0085; B22F 2003/1056; B22F 2003/1057; B22F 3/003
See application file for complete search history.

(56) References Cited

U.S. PATENT DOCUMENTS

| 4,328,257 A | 5/1982 | Muehlberger et al. |
| 4,838,337 A * | 6/1989 | Siemers .......................... 164/46 |

(Continued)

FOREIGN PATENT DOCUMENTS

| CN | 1792513 | 6/2006 |
| EP | 1 245 322 | 10/2002 |

(Continued)

OTHER PUBLICATIONS

Office Action (English translation) issued Apr. 15, 2014 in corresponding Japanese patent application No. 2012-524671.

(Continued)

*Primary Examiner* — David Angwin
*Assistant Examiner* — John J Norton
(74) *Attorney, Agent, or Firm* — Dentons US LLP

(57) ABSTRACT

A method and reactor of manufacturing an object by solid freeform fabrication, especially an object made of titanium or titanium alloys. An objective is to provide a method for rapid layered manufacture of objects in titanium or titanium alloys. A further objective is to provide a deposition chamber which allows prosecution of the method according to the invention.

8 Claims, 6 Drawing Sheets

(51) Int. Cl.
*B23K 9/16* (2006.01)
*B23K 37/02* (2006.01)
*B23K 37/04* (2006.01)
*B29C 67/00* (2006.01)
*G05B 19/4099* (2006.01)

(56) References Cited

U.S. PATENT DOCUMENTS

| | | | |
|---|---|---|---|
| 5,207,371 A * | 5/1993 | Prinz et al. | 228/125 |
| 5,398,193 A * | 3/1995 | deAngelis | 700/119 |
| 5,402,351 A | 3/1995 | Batchelder et al. | |
| 5,685,771 A * | 11/1997 | Kleppen | 454/56 |
| 5,791,560 A * | 8/1998 | Rogers et al. | 239/8 |
| 6,265,689 B1 | 7/2001 | Fusaro, Jr. | |
| 6,274,839 B1 | 8/2001 | Stone et al. | |
| 6,359,267 B1 | 3/2002 | Wilcox et al. | |
| 6,940,037 B1 * | 9/2005 | Kovacevic et al. | 219/121.64 |
| 7,168,935 B1 * | 1/2007 | Taminger et al. | 425/174.4 |
| 7,326,377 B2 | 2/2008 | Adams | |
| 2002/0139780 A1 | 10/2002 | Jones et al. | |
| 2002/0185476 A1 * | 12/2002 | Adams | 219/121.47 |
| 2003/0068518 A1 * | 4/2003 | Ando et al. | 428/608 |
| 2005/0173380 A1 | 8/2005 | Carbone | |
| 2005/0288813 A1 * | 12/2005 | Yang et al. | 700/119 |
| 2006/0185473 A1 | 8/2006 | Withers et al. | |
| 2007/0011873 A1 | 1/2007 | Teale et al. | |
| 2007/0122562 A1 | 5/2007 | Adams | |
| 2009/0014421 A1 | 1/2009 | Sathian et al. | |
| 2010/0006228 A1 | 1/2010 | Abe et al. | |
| 2010/0111744 A1 * | 5/2010 | Schleiss et al. | 419/5 |

FOREIGN PATENT DOCUMENTS

| | | |
|---|---|---|
| JP | 2-136616 | 11/1990 |
| JP | 2005-54197 | 3/2005 |
| WO | 2008/146920 | 12/2008 |

OTHER PUBLICATIONS

International Search Report issued Feb. 29, 2012 in International (PCT) Application No. PCT/NO2010/000303.

Patent Cooperation Treaty (PCT) International Preliminary Report on Patentability issued Mar. 6, 2012 in International (PCT) Application No. PCT/NO2010/000303.

Taminger, K.M. and Hafley R.A., "*Electron Beam Freeform Fabrication for Cost Effective Near-Net Shape Manufacturing*", NATO/RTOAVT-139 Specialists' Meeting on Cost Effective Manufacture via Net Shape Processing (Amsterdam, the Netherlands, 2006) (NATO).

Communication Relating to the Results of the Partial International Search issued Dec. 13, 2011 in International (PCT) Application No. PCT/NO2010/000303.

Great Britain Search Report (in English language) issued Feb. 11, 2010 in corresponding GB Application No. 0914301.7.

* cited by examiner

FIG. 1 Facsimile of fig. 1 of reference [1]

FIG. 2 Facsimile of figure 1 of US 2006/01854673

METHOD AND DEVICE FOR MANUFACTURING TITANIUM OBJECTS

This invention relates to a method and reactor for manufacturing objects by solid freeform fabrication, especially titanium and titanium alloy objects.

BACKGROUND

Structured metal parts made of titanium or titanium alloys are conventionally made by casting, forging or machining from a billet. These techniques have a disadvantage of high material use of the expensive titanium metal and large lead times in the fabrication.

Fully dense physical objects may be made by a manufacturing technology known as rapid prototyping, rapid manufacturing, layered manufacturing or additive fabrication. This technique employs computer aided design software (CAD) to first construct a virtual model of the object which is to be made, and then transform the virtual model into thin parallel slices or layers, usually horizontally oriented. The physical object may then be made by laying down successive layers of raw material in the form of liquid paste, powder or sheet material resembling the shape of the virtual layers until the entire object is formed. The layers are fused together to form a solid dense object. In case of depositing solid materials which are fused or welded together, the technique is also termed as solid freeform fabrication.

Solid freeform fabrication is a flexible technique allowing creation of objects of almost any shape at relatively fast production rates, typically varying from some hours to several days for each object. The technique is thus suited for formation of prototypes and small production series, but less suited for large volume production.

PRIOR ART

The technique of layered manufacturing may be expanded to include deposition of pieces of the construction material, that is, each structural layer of the virtual model of the object is divided into a set of pieces which when laid side by side form the layer. This allows forming metallic objects by welding a wire onto a substrate in successive stripes forming each layer according to the virtual layered model of the object, and repeating the process for each layer until the entire physical object is formed. The accuracy of the welding technique is usually to coarse to allow directly forming the object with acceptable dimensions, the formed object will thus usually be considered a green object or pre-form which need to be machined to acceptable dimensional accuracy.

Taminger and Hafley [1] disclose a method and device for manufacturing structural metal parts directly from computer aided design data combined with electron beam freeform fabrication (EBF). The structural part is build by welding on successive layers of a metallic welding wire which is welded by the heat energy provided by the electron beam. The process is schematically shown in FIG. 1, which is a facsimile of FIG. 1 of [1]. The EBF process involves feeding a metal wire into a molten pool made and sustained by a focused electron beam in a high vacuum environment. The positioning of the electron beam and welding wire is obtained by having the electron beam gun and the positioning system (the support substrate) movably hinged along one or more axis (X, Y, Z, and rotation) and regulate the position of the electron beam gun and the support substrate by a four axis motion control system. The process is claimed to be nearly 100% efficient in material use and 95% effective in power consumption. The method may be employed both for bulk metal deposition and finer detailed depositions, and the method is claimed to obtain significant effect on lead time reduction and lower material and machining costs as compared to the conventional approach of machining the metal parts.

The electron beam technology has a disadvantage of being dependent upon a high vacuum of $10^{-1}$ Pa or less in the deposition chamber. This may be avoided by substituting the spot heating by the focused electron beam by a plasma transferred arc. In this case the formation of the local melt pool is obtained by heat created by an arc discharge between two inert electrodes and which is directed onto the melting spot by a focused stream of an inert plasma forming gas. This process may readily be applied at atmospheric pressures and thus allow simpler and less costly process equipment. An example of this technology is disclosed in U.S. Pat. No. 7,326,377 and US 2006/185473. This technology is sometimes denoted plasma transferred arc solid freeform fabrication (PTA-SFFF).

US 2006/185473 discloses a method where a high energy plasma beam such as a welding torch in place of the very expensive laser traditionally used in a solid freeform fabrication (SFFF) process with relatively low cost titanium feed material by combining the titanium feed and alloying components in a way that considerably reduces the cost of the raw materials. More particularly, in one aspect the present invention employs pure titanium wire (CP Ti) which is lower in cost than alloyed wire, and combines the CP Ti wire with powdered alloying components in-situ in the SFFF process by combining the CP Ti wire and the powder alloying components in the melt of the welding torch or other high power energy beam. In another embodiment, the invention employs titanium sponge material mixed with alloying elements and formed into a wire where it may be used in an SFFF process in combination with a plasma welding torch or other high power energy beam to produce near net shaped titanium components. The process according to US 2006/185473 is schematically drawn in FIG. 2, which is a facsimile of FIG. 1 of this document.

Titanium metal or titanium alloys heated above 400° C. may be subject to oxidation upon contact with oxygen. It is thus necessary to protect the weld and heated object which is being formed by layered manufacture against oxygen in the ambient atmosphere. WO 2009/068843 discloses an inert gas shield for welding which produces an even outflow of protecting inert gas. By placing the shield above the object which needs to be protected, the even flow of inert gas will displace ambient atmosphere without creating vortexes which may entrain ambient oxygen containing gas. The shield is formed as a hollow box of which the inert gas enters the interior and is allowed to escape the interior of the box through a set of narrow openings made in one wall of the box.

OBJECTIVE OF THE INVENTION

The main objective of the invention is to provide a method for rapid layered manufacture of objects in titanium or titanium alloys.

A further objective of the invention is to provide a deposition chamber which allows prosecution of the method according to the invention.

DESCRIPTION OF THE INVENTION

The invention is based on the realisation that by making the deposition chamber sufficiently void of oxygen, the need for employing protective measures to avoid oxidising the newly welded area by ambient atmospheric oxygen is no longer present such that the welding process may proceed at a larger velocity. For example, in production of objects of titanium or titanium alloy, there is no longer need for cooling the welded zone to below 400° C. to avoid oxidation.

Thus in a first aspect, the invention relates to a method of production of an object in a weldable material by solid freeform fabrication, wherein the method comprises:
  creating a virtual three dimensional model of the object which is to be formed,
  dividing the virtual three dimensional model into a set of virtual parallel layers and then dividing each layer into a set of virtual quasi one-dimensional pieces, forming a virtual vectorized layered model of the object,
  loading the vectorized layered model of the object into a welding control system able to regulate the position and activation of a support substrate, high energy plasma transferred arc welding torch, and a wire feeding system placed in a closed reactor vessel,
  substituting the atmosphere inside the closed reactor vessel with an inert atmosphere with a pressure of about $10^5$ Pa and which contains maximum 50 ppm oxygen,
  engaging the control system to weld a series of quasi one-dimensional pieces of the weldable material onto the supporting substrate in a pattern according to the first layer of the virtual vectorized layered model of the object,
  forming the second layer of the object by welding a series of quasi one-dimensional pieces of the weldable material onto the previous deposited layer in a pattern according to the second layer of the virtual vectorized layered model of the object, and
  repeating the welding process layer by layer for each successive layer of the virtual vectorized layered model of the object until the entire object is formed.

The term "virtual vectorized layered model of the object" as used herein means a three dimensional computerized representation of the object which is to be formed, where the object is divided into a set of parallel layers and where each layer is divided into a set of quasi one-dimensional pieces. The term "quasi one-dimensional pieces" as used herein means longitudinal rod-resembling pieces of the welding material which when laid side by side in a specific pattern according to the vectorized model will form the object that is to be formed. The rod-resembling pieces may be bended (curved) or linear. The virtual vectorized layered model may be transformed to a physical object by welding together pieces of a welding wire corresponding to each virtual quasi one-dimensional piece of the virtual vectorized layered model.

The virtual model includes information of the dimensions and is given a three dimensional design which corresponds to the three dimensional design of the physical object that is to be manufactured. The virtual vectorized layered model may then be applied as a template for the physical construction of the object. That is, the virtual model is transformed into building instructions executed by the control system of the solid freeform fabrication equipment such that the physical object is being manufactured piecemeal by welding a wire onto a substrate in successive stripes, where each welded stripe corresponds to a piece of the virtual vectorized layered model. The principle of the manufacturing process is shown in FIG. 1, which show construction of a metallic object by welding a piece onto a first layer by electron beam freeform fabrication (EBF). The invention may apply any known or conceivable software for computer assisted design for constructing the virtual vectorized layered model.

The method according to the first aspect of the invention may be employed with any material which is suited for solid freeform fabrication. This includes any weldable metal or alloyed metal and polymeric materials. The method is especially suited for manufacturing objects in titanium or alloyed titanium.

The inert gas may be any chemically inactive gas towards the weldable material being used at temperatures below the softening temperature of the material. The inert gas may advantageously be a gas with higher density than air in order to alleviate the substitution of the air inside the reactor chamber with the inert gas. Argon is an example of a suited inert gas, but may also include helium, a gas mixture of Ar—He or other inert gases. The oxidation problem of i.e. titanium and alloyed titanium becomes a problem when the inert gas contains more than 50 ppm oxygen. The oxygen level may however advantageously be lower, such as about 20 ppm oxygen.

One standing problem of prior art plasma transferred arc solid freeform fabrication of titanium or alloyed titanium objects, is that the metal needs to be protected against oxygen in the ambient atmosphere at temperatures above around 400° C.

This leads to regular interruptions in the welding process to avoid overheating the parts of the formed object. By employing an atmosphere in the welding zone with less than 50 ppm oxygen, this need for regular intervals to avoid overheating is substantially reduced since the object may be allowed to be heated to above 400° C. The only temperature restriction of the process when employing an oxygen deficit atmosphere is that the temperature of the deposited metal phase must be below the softening point of the metal. The term "softening point" as used herein means the temperature at which the material (i.e. titanium or alloyed titanium) attains a particular degree of softening under specified conditions of test. The softening point is dependent upon which alloy being employed, but is typically above 800° C. or higher when employing titanium or alloyed titanium.

In a second aspect, the invention relates to a reactor for production of an object of a weldable material by solid freeform fabrication, where the reactor comprises:
  a reactor chamber (1) which is closed to the ambient atmosphere,
  an actuator (2) controlling the position and movement of a support substrate (3) placed inside the reactor chamber,
  an actuator (4) controlling the position and movement of a high energy plasma transferred arc welding torch (5) with a wire feeder,
  a control system able to read a virtual three dimensional vectorized layered model of the object which is to be formed and employ the virtual model to control the position and movement of the actuators (2, 4), operation of the welding torch (5) and wire feeder such that a physical object is build by welding a layered structure of quasi one-dimensional pieces of the weldable material onto the supporting structure according to the virtual three dimensional vectorized layered model of the object which is to be formed,
characterised in that
  all adjacent wall elements (6) of the walls of the reactor chamber are joined with an obtuse angle (larger than 90°),
  the actuator (2) extends from below the reactor chamber and protrudes into the reactor chamber through an opening (7) in the reactor chamber wall holding the support substrate (3) inside the reactor chamber, the opening (7) is sealed by at least one elastic gas impermeable membrane (8) which is gas tight attached to the reactor wall at the opening (7) and to the actuator (2), the actuator (4) extends from the outside of the reactor chamber and protrudes into the reactor chamber through an opening (9) of the wall of reactor chamber holding the high energy plasma transferred arc welding torch (5) with wire feeder of the weldable material inside the reactor chamber, the opening (9) is sealed by the at least one elastic gas impermeable membrane (10) which is gas tight attached to the reactor wall at the opening (9) and to the actuator (4), and the reactor is equipped with at least one closable gas inlet (11) located in the lower part the reactor chamber and at least one closable gas outlet (12) located at the upper part of the reactor chamber.

The term "wall of the reactor chamber" as used herein, includes all sides of the enclosed compartment constituting the reactor chamber including floor and ceiling unless specified otherwise. The term "lower part of the reactor chamber" as used herein means some location in the lower level (close to the floor) of the reactor chamber, while the term "upper part of the reactor chamber" as used herein means some location in the upper level (close to the ceiling) of the reactor chamber.

The feature of adjoining the wall elements constituting the walls of the reactor chamber with an obtuse angle combined with at least one closable gas inlet at the lower part of the chamber and at least one closable gas outlet at the upper part of the reactor chamber, provides the ability to substitute the atmosphere inside the chamber with inert pure argon gas, helium, or a gas mixture of Ar—He in a simple and effective manner which practically eliminates vortices and back flow zones entraining remnants of the oxygen containing gas which is to be substituted. This feature may thus be considered as a mean for effective filling of the reactor chamber with inert gas. Thus the term "highest level" as used herein means the highest part of the reactor chamber relative to the gravitational field, and the term "the lowest level" is the lowest part of the reactor chamber relative to the gravitational field.

The effect of the obtuse angle between adjacent wall elements increases the larger angle being employed. However, the size of the reactor compartment will increase with increasing angle. Thus in practice it is necessary to find a trade-off between the need for avoid sharp edges inside the chamber and the size of the chamber. Thus the obtuse angle should in practice be between 95 and 130°, more suitably between 100 and 120°.

The feature of placing the main parts of the actuators controlling the position and movement of the support substrate and the welding torch (including wire feeder) on the outside of the reactor chamber is to reduce the possibility of forming back flow zones or vortex forming zones around the production equipment inside the reactor chamber to a level as low as possible, and thus aid the process of flushing out the oxygen in the reactor chamber before initiating the solid freeform fabrication of the object. The flushing of the chamber is alleviated by placing electric cables, tubes etc. passing through the reactor walls at a distance of each other of at least 5 mm.

The elastic gas tight sealing of the openings in the reactor chamber may be obtained by employing one or more layers of elastic and gas impermeable rubber. The rubber sheet(s) may be attached by using clamping frames which is attached to the reactor wall and clamping rings attached to the actuator arm protruding in through the opening in the reactor chamber. In this manner, the actuator arms is given the possibility of moving rather freely in relation to the reactor wall and still obtain a gas tight closure of the opening in the reactor wall by the elastic gas impermeable rubber.

The oxygen protection of the reactor chamber may be increased by inserting sufficient argon to obtain a slightly elevated pressure inside the reactor chamber as compared to the ambient atmosphere, such as for instance around 100 Pa above the ambient atmosphere. The reactor chamber may also be equipped with a measuring instrument to monitor one or more of the oxygen, nitrogen and other gas contents in the inert atmosphere inside the chamber, and thus allowing flushing out eventual occurrence of inacceptable oxygen, nitrogen etc levels in the reactor chamber before reaching levels harmful for the metal object under manufacturing.

The reactor chamber according to the second aspect of the invention may easily be filled with argon or other inert atmosphere to obtain an atmosphere inside the chamber with an oxygen concentration of 50 ppm or less. At such low oxygen levels, there is no significant risk of inacceptable oxidation of the object being formed, such that the welding process may be run at an elevated temperature as compared to prior art solid freeform fabrication methods. The temperature of the object may be increased up to the softening point. In case of employing titanium or alloyed titanium, the temperature of the metal may be as high as 800° C. or more during the layered fabrication of the object. This feature will thus significantly reduce the time required to cool the newly formed web before proceeding with the welding process as compared to prior art which requires temperatures below 400° C.

By use of a reactor chamber according to the second aspect of the invention, it is observed that the air inside the chamber may be completely flushed out by inserting argon gas in a steady easy manner at flow conditions giving laminar flow through the gas inlets in the bottom of the chamber by inserting only the same amount of inert gas as the volume of the chamber and still obtain an oxygen content in the inert argon atmosphere of about 20 ppm oxygen. It is thus not necessary to form an overflow during filling argon; it is sufficient to only gently push out the air and stop filling inert gas and close the inert gas outlet at the top of the chamber as soon as all air is pushed out. This gives an advantage in very little use of the costly inert gas. The reactor chamber may also include a closed cooling circuit where inert gas are taken out of the chamber, passed through a heat-exchanger to lower its temperature, and then inserted into the reactor chamber in a closed recycle loop. This feature is advantageous to avoid overheating the reactor chamber in cases where the welding torch is operated with high powers. The welding torch may be operated with effects of 5-6 kW or higher, and in such cases a sealed reactor space of 1-2 m³ would rapidly be heated to high temperatures without active cooling of the gas phase inside the chamber.

The invention may apply any known or conceivable control system for operating the actuators, welding torch, and wire feeder. The actuators may advantageously be equipped with a four axis motion control system (X, Y, X, and rotation). The invention may apply any known or conceivable welding torch and wire feeder system able to perform layered manufacturing of metallic objects by the technique known as plasma transferred arc solid freeform fabrication (PTA-SFFF). One example of such equipment is shown in FIG. 2, which is a facsimile of FIG. 1 of US 2006/0185473.

LIST OF FIGURES

EXAMPLE EMBODIMENT OF THE INVENTION

Figure 1:
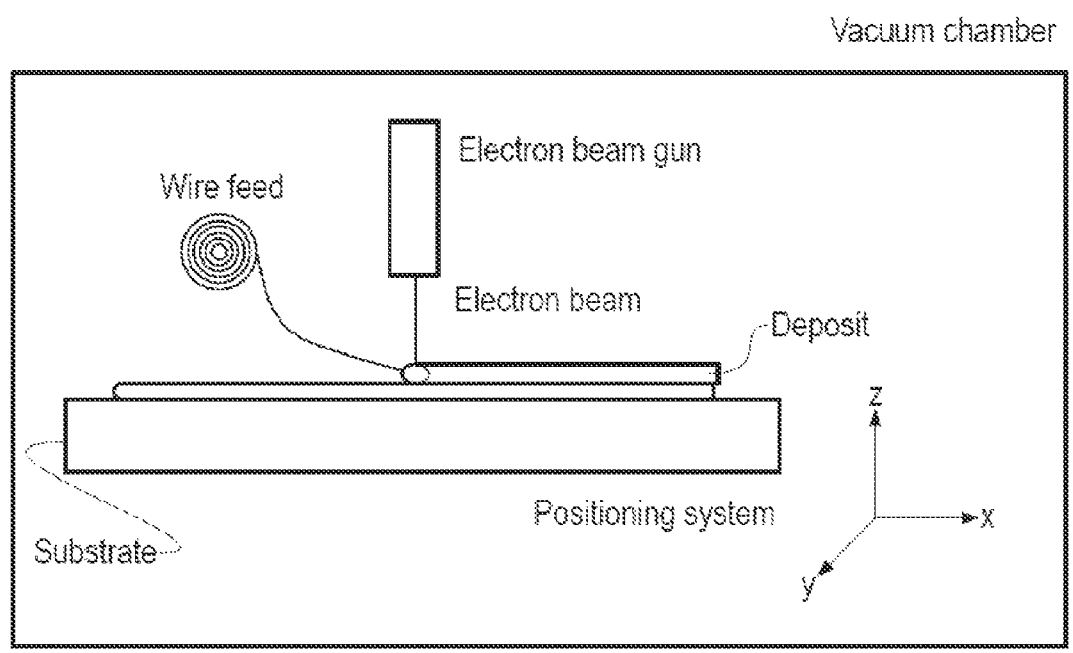
FIG. 1 is a facsimile of FIG. 1 of [1] showing a schematic view of the principle of solid freeform fabrication.
Figure 2:
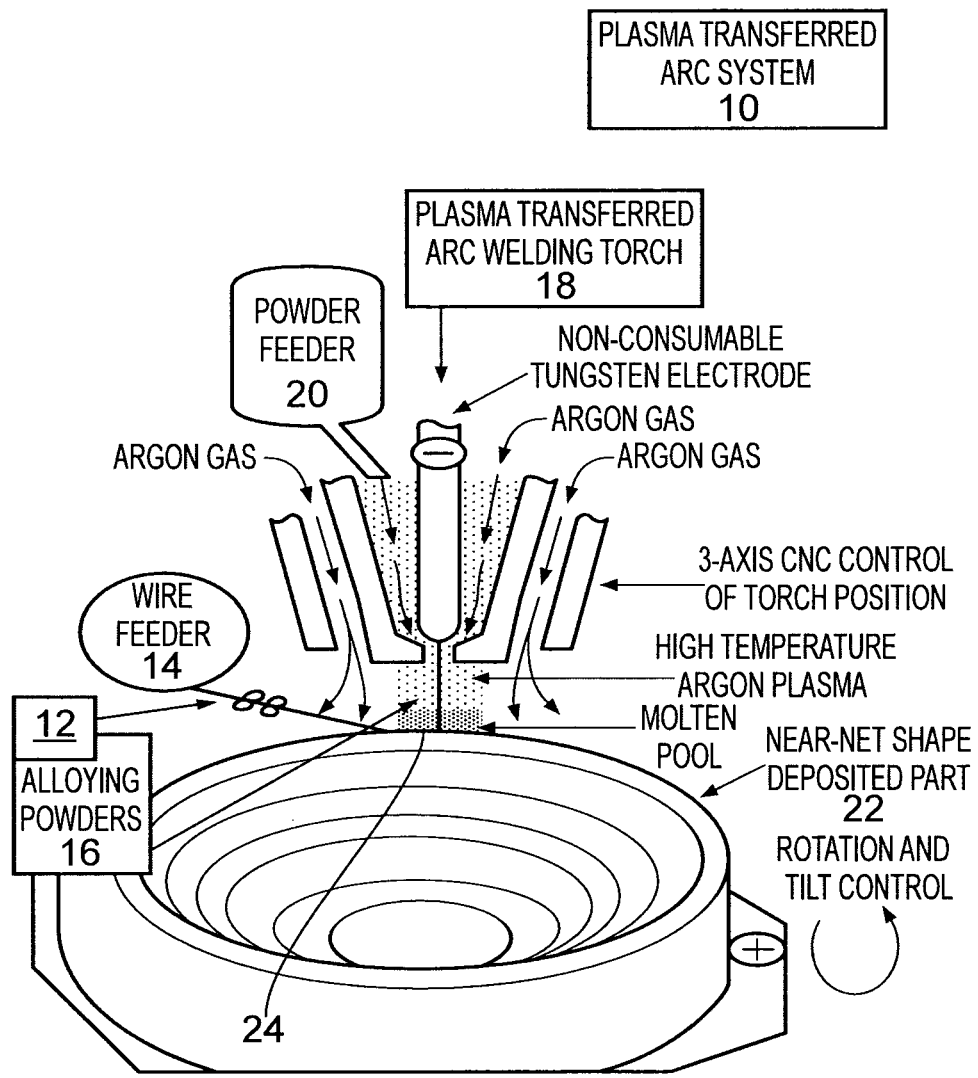
FIG. 2 is a facsimile of FIG. 1 of US 2006/01854673 showing a schematic view of the principle of plasma transferred arc solid freeform fabrication.
Figure 3:
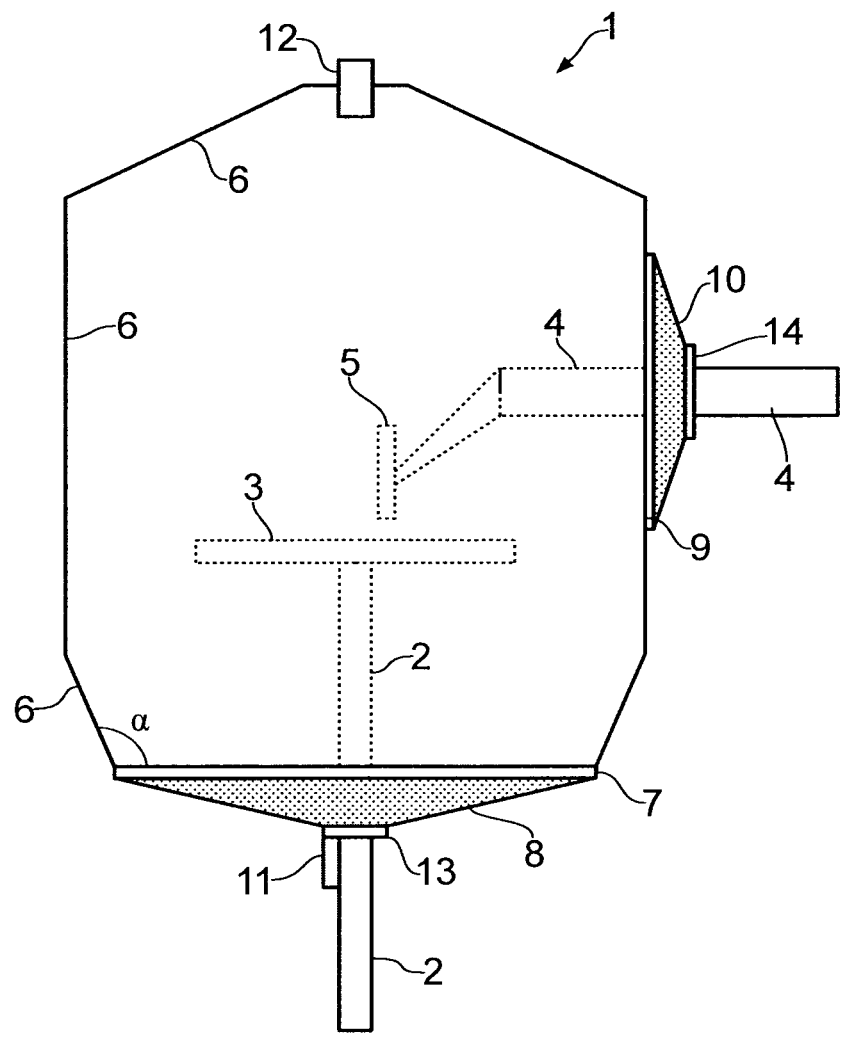
FIG. 3 is a schematic side view of one embodiment of the reactor according to the invention.

The inventive features of the invention according to the second aspect of the invention are schematically presented in FIG. 3.

The figure shows a reactor 1 with an internal closed compartment made by a set of wall elements 6. The wall elements 6 are positioned such that there are no sharp edges, that is, edges with walls angled at angles of 90° or less. All internal wall angles, α, of the reactor chamber are obtuse (larger than 90°). An actuator 2 which controls the position and movement of a support substrate 3 is located outside of the reactor chamber and protrudes through an opening 7 such that the support substrate 3 is located inside the reactor chamber. The opening 7 is closed by an elastic gas tight membrane 8. An actuator 4 which controls the position and movement of a high energy plasma transferred arc welding torch 5 with wire feeder for feeding a wire of the weldable material is located outside of the reactor chamber and protrudes through an opening 9 such that the high energy plasma transferred arc welding torch 5 with wire feeder is located inside the reactor chamber. The opening 9 is closed by an elastic gas tight membrane 10. The reactor chamber is equipped with at least one closable gas inlet 11 and at least one closable gas outlet 12 in order to flush out oxygen containing gases in the reactor chamber and substitute this gas with inert gas.

Figure 4:
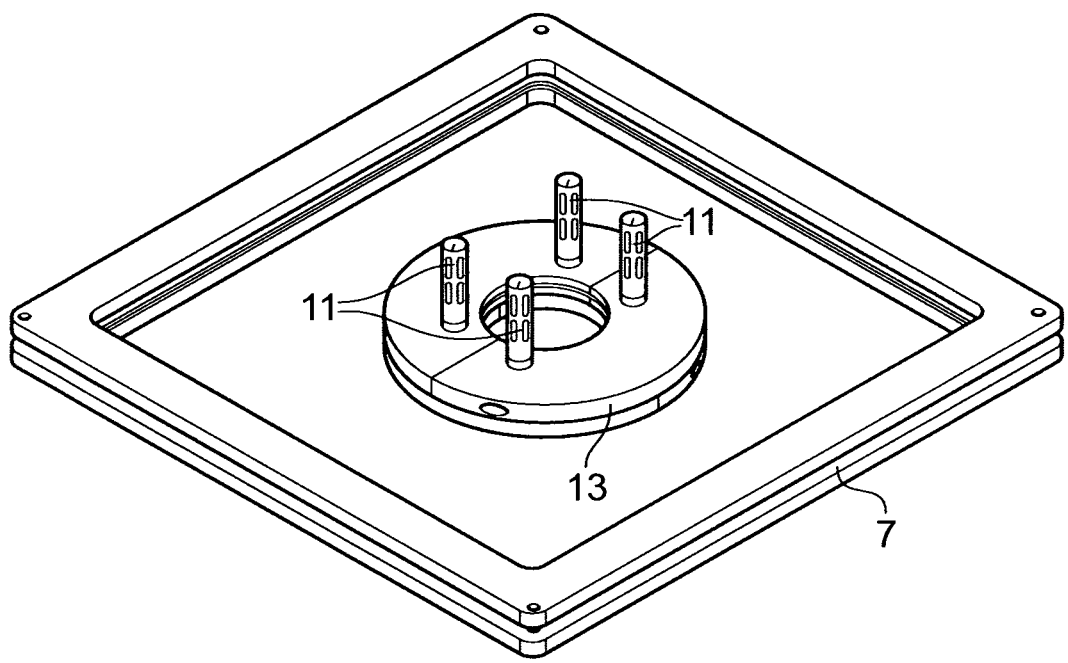
FIG. 4 is an expanded view of an embodiment of the clamping frames for holding two layers of flexible gas tight membrane closing the opening in the bottom of the reactor according to the invention.

FIG. 4 shows an expanded view of a clamping frame 7 which may be employed for holding two layers of an elastic gas tight membrane. By forming two sheets of the membrane with dimensions such that the edges enters into the space between two of the clamping frames, the membrane may be firmly and gas tight attached to the reactor wall 6 by fastening the clamps to the reactor walls such that they are pressed onto each other. The actuator arm 2 protruding into the chamber is poking through the hole in the clamping ring 13. The dimensions of the rings 13 are adjusted to form a gas tight grip around the actuator arm. The gas tight membrane is attached to the clamping rings 13 in the same manner as to the clamping frames 7. The figure also shows an example of placement of the closable gas inlets 11.

Figure 5A:
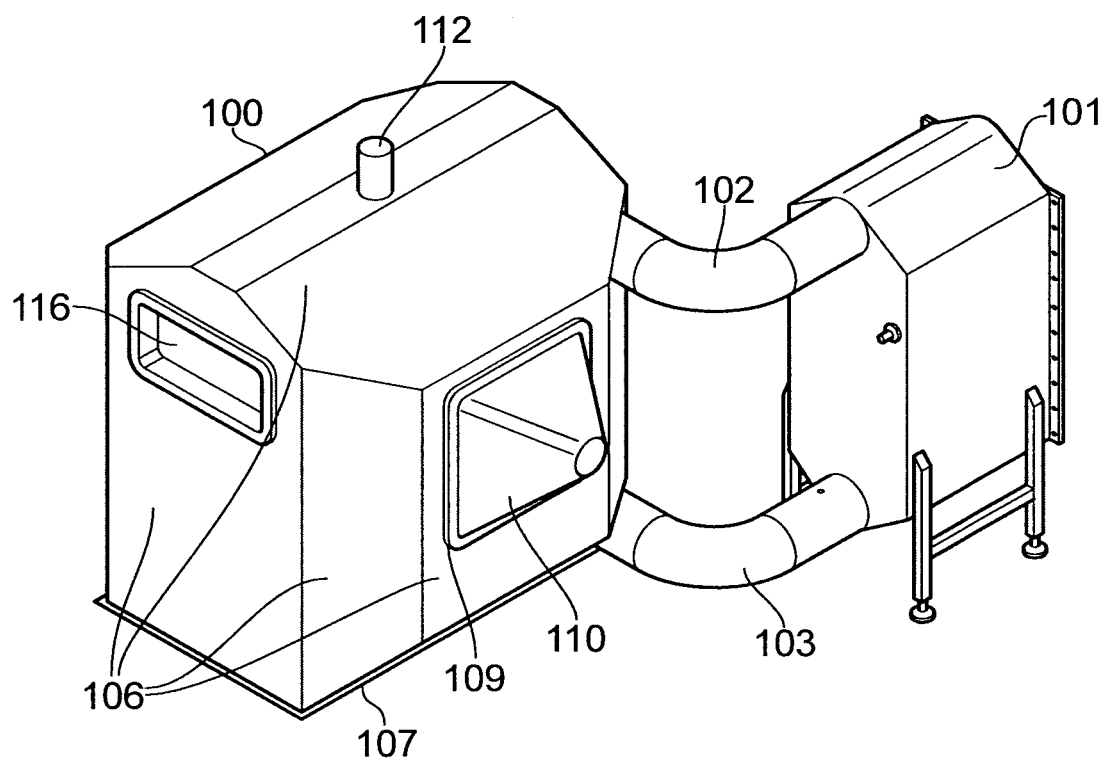
FIGS. 5a and 5b are different side views of an embodiment of the reactor according to the invention.
Figure 5B:
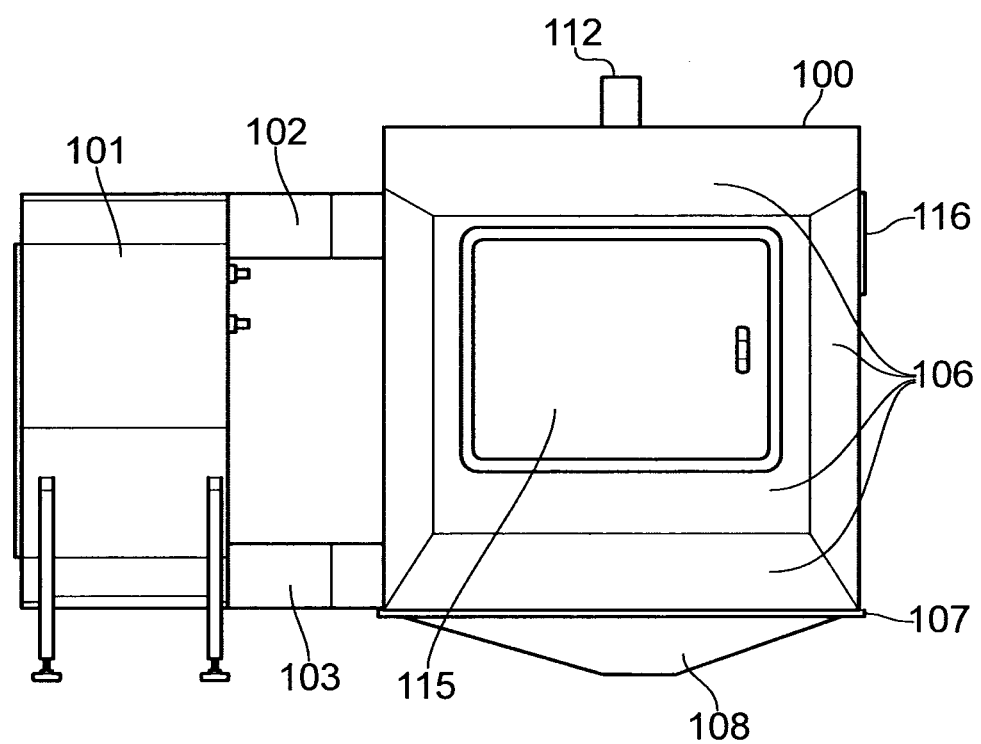

FIGS. 5a and 5b show two different side views of an example embodiment of the reactor 100. The reactor 100 is made up of a number of wall elements 106 to form a closed cabinet. The wall elements may be provided with a gas tight glass window 116 to allow visual observation of the process or with a gas tight door to allow entry into the chamber before and after formation of the object. The embodiment is equipped with a cooling loop comprising gas outlet 102, gas inlet 103 and heat exchanger 101. From FIG. 5a it is seen that the side wall opening for one actuator is placed is closed by using a clamping frame 109 holding an elastic rubber membrane 110 (the actuator entering through the membrane is not shown for providing clarity). From FIG. 5b, it is seen that the bottom opening is closed by using a clamping frame 107 holding an elastic rubber membrane 108 (the actuator entering through the membrane is not shown for providing clarity).

REFERENCE

1. Taminger, K. M. and Hafley, R. A., "Electron Beam Freeform Fabrication for Cost Effective Near-Net Shape Manufacturing", NATO/RTOAVT-139 Specialists' Meeting on Cost Effective Manufacture via Net Shape Processing (Amsterdam, the Netherlands, 2006) (NATO). pp 9-25, http://ntrs.nasa.gov/archive/nasa/casi.ntrs.nasa.gov/20080013538_2008013396.pdf.

The invention claimed is:

1. A reactor for production of an object of a weldable material by solid freeform fabrication, where the reactor comprises:
    a reactor chamber (1), which is closed to the ambient atmosphere, wherein the reactor chamber (1) is filled with argon as an inert gas,
    an actuator (2) controlling the position and movement of a support substrate (3) placed inside the reactor chamber (1),
    an actuator (4) controlling the position and movement of a high energy plasma transferred arc welding torch (5) with a wire feeder,
    a control system able to read a virtual three dimensional vectorized layered model of the object which is to be formed and employ the virtual model to control the position and movement of the actuators (2, 4), operation of the welding torch (5) and wire feeder such that a physical object is built by welding a layered structure of quasi one-dimensional pieces of the weldable material onto the supporting structure according to the virtual three dimensional vectorized layered model of the object which is to be formed,
    characterized in that
    all adjacent wall elements (6) of the walls of the reactor chamber are joined with an obtuse angle, the actuator (2) extends from below the reactor chamber (1) and protrudes into the reactor chamber (1) through a first opening (7) in the reactor chamber (1) wall holding the support substrate (3) inside the reactor chamber (1),
    the first opening (7) is sealed by at least one elastic gas impermeable membrane (8), which is gas tight attached to the reactor wall at the first opening (7) and to the actuator (2),
    the actuator (4) extends from the outside of the reactor chamber (1) and protrudes into the reactor chamber (1) through a second opening (9) of the wall of reactor chamber (1) holding the high energy plasma transferred arc welding torch (5) with wire feeder of the weldable material inside the reactor chamber (1),
    the second opening (9) is sealed by the at least one elastic gas impermeable membrane (10), which is gas tight attached to the reactor wall at the second opening (9) and to the actuator (4), and
    the reactor is equipped with at least one closable gas inlet (11) located in the lower part of the reactor chamber (1) and at least one closable gas outlet (12) located at the upper part of the reactor chamber (1).

2. The reactor according to claim 1, wherein the first and second openings (7, 9) are closed by use of a two layer gas two-layer gas-tight elastic rubber (8, 10) which are attached by using clamping frames (109) which are attached to the reactor wall and clamping rings attached to the actuator arm (2, 4) protruding in through the opening in the reactor chamber (1).

3. The reactor according to claim 1, wherein the preset maximum value of the oxygen concentration is set to 20 ppm.

4. The reactor according to claim 1, wherein the reactor is equipped with a closed cooling circuit comprising an inert gas outlet (102), a heat exchanger (101) and an inert gas inlet (103) for cooling the inert gas in the reactor chamber.

5. The reactor according to claim 1, wherein the obtuse angle between any adjacent wall element (6) constituting the reactor chamber internal walls is between 95 and 130°.

6. The reactor according to claim 1, wherein the weldable material is a weldable metal, a weldable alloyed metal, or a polymeric material.

7. The reactor according to claim 1, wherein the weldable material is titanium or alloyed titanium.

8. The reactor according to claim 1, wherein the obtuse angle between any adjacent wall element (6) constituting the reactor chamber internal walls is between 100 and 120°.

* * * * *